United States Patent
McClintock et al.

(10) Patent No.: US 9,310,982 B1
(45) Date of Patent: Apr. 12, 2016

(54) IMMERSIVE CONTENT TO ENHANCE USER MEDIA EXPERIENCE

(71) Applicant: Amazon Technologies, Inc., Reno, NV (US)

(72) Inventors: Jon Arron McClintock, Seattle, WA (US); George Nikolaos Stathakopoulos, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 229 days.

(21) Appl. No.: 14/185,793

(22) Filed: Feb. 20, 2014

(51) Int. Cl.
*G06F 3/0482* (2013.01)
*G06F 3/0484* (2013.01)

(52) U.S. Cl.
CPC .................................. *G06F 3/04842* (2013.01)

(58) Field of Classification Search
CPC ........... G06F 3/048; G06F 3/14; G06F 17/30; G06F 3/0487; G06F 17/20; G06F 17/21; G06F 15/16
See application file for complete search history.

(56) References Cited

U.S. PATENT DOCUMENTS

| | | | | |
|---|---|---|---|---|
| 2010/0306122 | A1* | 12/2010 | Shaffer | G06Q 99/00 705/319 |
| 2012/0131150 | A1* | 5/2012 | Jeong | G06F 15/0291 709/219 |
| 2012/0210203 | A1* | 8/2012 | Kandekar | G06F 17/241 715/230 |
| 2012/0227002 | A1* | 9/2012 | Tiwari | G06F 3/0488 715/765 |
| 2012/0260163 | A1* | 10/2012 | Kim | G06F 3/0483 715/273 |
| 2013/0015954 | A1* | 1/2013 | Thorne | G06F 17/241 340/8.1 |
| 2013/0073449 | A1* | 3/2013 | Voynow | G06Q 30/0601 705/39 |
| 2013/0151954 | A1* | 6/2013 | Ierullo | G06F 17/30861 715/254 |
| 2014/0281960 | A1* | 9/2014 | Bank | G06Q 10/101 715/705 |

* cited by examiner

*Primary Examiner* — Rashawn Tillery
(74) *Attorney, Agent, or Firm* — Lindauer Law, PLLC

(57) ABSTRACT

Content corresponding to a literary work, movie, audio presentation, or other media is provided to a computing device associated with a user. Immersive content related to the content may be communicated to a computing device and presented to the user at times when the content is not being consumed. The formatting, communicational modes, apparent source, subject matter, or other aspects of the immersive content may correspond to the preferences or other information provided by the user. In this way, user engagement with a story or other media may be stimulated or enhanced when the user is not actively consuming the primary content.

20 Claims, 11 Drawing Sheets

IMMERSIVE CONTENT TO ENHANCE USER MEDIA EXPERIENCE

BACKGROUND

Users consume stories or other media content by way of e-book readers, tablet computers, or other respective computing devices. Users often identify with the characters in a story, their various challenges and successes, and so on. However, such user enjoyment may wane when the story content is not being actively consumed. Enhanced user engagement with story and other media content is sought after.

Figure 1:
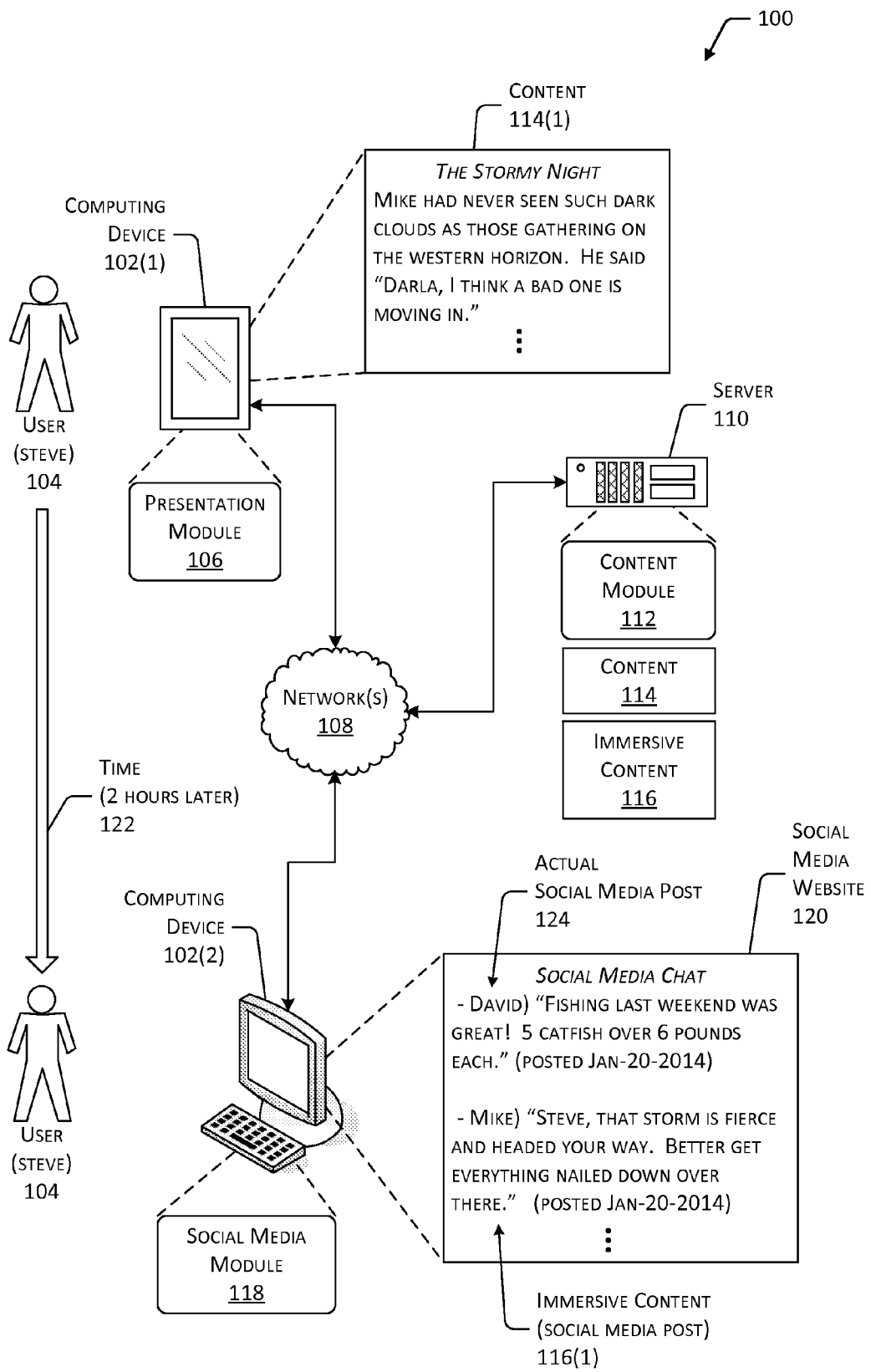
FIG. 1 depicts views including respective computing devices and a server, and content and immersive content that are consumed by a user of the computing devices.

Certain implementations and embodiments will now be described more fully below with reference to the accompanying figures, in which various forms are shown. However, various forms may be implemented in many different ways and should not be construed as limited to the implementations set forth herein. Like numbers refer to like elements throughout.

DETAILED DESCRIPTION

Books, movies, audio books, and other media content are consumed by people using e-book readers, media devices, tablet or wearable computers, and other respective computing devices. Users often become engaged in a story or other media presentation while that content is being consumed, but such engagement and the corresponding enjoyment may diminish when the user returns to other tasks and routine endeavors. Users may also find themselves distracted by various demands and real-life events, and forget to return to consuming the content. Additionally, a user may forget details or circumstances within a story or presentation if the principle content is set aside for an extended period of time.

In one example, a user acquires a novel as digital content provided to an e-book reader. The user then reads or "consumes" an initial portion, such as the first 25 pages of that content, by way of the e-book reader. The user then sets the e-book reader aside and attends to other responsibilities, goes to sleep, and so forth. The user may already have a significant interest in or affinity for a particular character in the story, relate to particular challenges or situations, or be engaged in the content in some other way. However, the user's own circumstances may not permit them to return to the novel content for the next few days. As a result, the user's enjoyment or "immersion" in the story may begin to fade.

Toward the foregoing concerns, a user interface or other input device may be presented to the user by way of the e-book reader, a tablet or laptop computer, or other suitable device. The user interface may include various selections, input boxes, or other tools or devices configured to acquire input from the user regarding the novel's content, contact information for or communicational modes available to the user, or other data. For example, the user may indicate likes or dislikes regarding particular characters in the story, provide contact information corresponding to the user's involvement in social media, specify a cellular phone number or e-mail address, and so forth. Other kinds of content-related or user-specific information may also be acquired by way of the user interface.

Such user selections and inputs may then be communicated to a server or other computing system administered by an entity associated with the novel's content. Such an entity may be an author or publisher of the content, a vendor, or some commercial or other relevant entity. The server may process the user-input information and establish a data file for that user. Thus, the server is now aware of user contact information, user alignment with characters or subject matter within the story, time-of-day or day-of-the-week restrictions or preferences regarding the reception of communications by the user, and so on.

In turn, the e-book reader may communicate information regarding the user's current place within the content, or "consumption status", back to the server. The server may cross-reference the user's consumption status with predetermined "immersive content". The immersive content may correspond to the story of the content, and may be particular to a character or characters within the story, germane to their situation where the user left off, or correspondent to or derivative of the novel's content in some other way. The server may then provide the immersive content to the e-book reader, or another device associated with the user. Thus, immersive content may include or elaborate on one or more persons, places, situations, events, or other aspects of the corresponding content.

For instance, immersive content may be sent as a text message to a cellular phone associated with the user, wherein the text message appears to be sent by a particular character in the story. The immersive content may address the user directly, explain that character's present mindset, provide background information that further embellishes the story, and so forth. The particular immersive content, the apparent character of origin, the tone of the message, and so forth, may be configured in accordance with the preferences provided by way of user input to the user interface.

The immersive content may also solicit "advice" or other user input regarding a character's course of action or other decision, wherein such user input is communicated back to the server. The server may then use this input to select predetermined content of the story that has not yet been provided to the user's e-book reader. That content may then be sent to the e-book reader without user knowledge or intervention, perhaps under the guise of an "upgrade" or installment, which does not alert the user to the particular change or addition being made. In this way, a user response to a query or other solicitation may guide the course of the storyline by way of corresponding content installments.

In another example, plural users are members of a "book club" or similar association. A novel, serial, poem, or other literary work is acquired as digital content for consumption by the users by way of their respective computing devices. Each of the users may also provide electronic contact information, character preferences, and so on, with respect to receiving immersive content corresponding to the story of the literary work.

Sometime thereafter, each of the computing devices may report a consumption status for the corresponding user to a server or other centralized receiving system. The server may then compare the relative consumption state or progress of each of the users, and identify a particular user that is lagging behind the other users within the content. For instance, the particular user may be at page 20, line 10 in the content, while a leading user is at page 42, line 15 in the content. Other gauging systems or thresholds may also be used.

The server may then send an offer to provide accelerated content to the particular user, by way of an associated device. Such accelerated content may be a condensed version, or abstract, of the content that separates the particular user from the leading user. The accelerated content may include other matter, as well. In general, the accelerated content is formulated to allow the particular user to "catch up" with the other members of the book club without having to consume all of the intervening content.

The particular user may communicate an acceptance of the offer, wherein the accelerated content is then provided from the server to their e-book reader or other computing device. In turn, the e-book reader may advance a pointer or other mechanism being used to track the consumption status of the particular user within the content, in view of the accelerated content that has been provided. In the present example, the particular user is now assumed to be at about page 42, line 15—the same location as the leading user—as a result of the accelerated content. Other actions or status-related operations may also be performed. Respective variations on the foregoing may also be used in accordance with the methods, devices, and systems described herein.

FIG. 1 depicts views 100 including particular elements and operations performed by each. The views 100 are illustrative and non-limiting in nature, and other elements, devices, systems, or respective operations are also contemplated.

A computing device 102(1) is depicted as a tablet computer. Numerous other types of computing devices 102, such as "smart phones", wearable computers, laptop computers, desktop computers, media devices, e-book readers, in-vehicle systems, and so on, may also be used. The computing device 102(1) is associated with a user 104. The computing device 102 includes a presentation module 106 configured to present textual content, video or audio content, or other kinds of content, in accordance with digital content provided to and stored within the computing device 102(1). The presentation module 106 may include computer-executable program code stored on non-transitory storage media, electronic circuitry, or other constituency. The user device 102(1) is also configured to communicate signals, data, or other information to other devices by way of one or more networks 108. The networks 108 may be defined by or include access to the Internet, a local-area network (LAN), a wide-area network (WAN), access to cellular networks, or other suitable resources.

A server 110 is configured to communicate with the computing device 102(1) by way of the one or more networks 108. In one instance, the server 110 may be owned or administered by an entity such as a commercial enterprise, which offers content such as e-books, movies, video or audio presentations, and so on. The server 110 may be associated with other entity types, as well. The server 110 includes a content module 112. The content module 112 may be configured to provide content 114 or immersive content 116 to respective computing devices 102. The content 114 may comprise text, graphics, video, audio, and so forth. For example, the content 114 may include an electronic book (eBook), audiobook, video, and so forth. The content 114 may present a story which includes one or more aspects.

The story may be fiction or non-fiction, while the aspects may include characters, places, scenes, occurrences, items which are referred to explicitly or implicitly by the story, and so forth. The immersive content 116 may comprise text, graphics, video, audio, and so forth. The immersive content 116 may include elements or aspects of the content, or information about one or more of the aspects of the content. In one implementation, the immersive content 116 may include direct quotes, clips, or excerpts from the content 114, or other information. The content module 112 may include computer-executable program code stored on non-transitory storage media, electronic circuitry, or other constituency. Thus, the immersive content 116 may be "narrative" in nature, connecting or elaborating on one or more elements or events within the content 114 that have already been read or "consumed" by the user 104.

The user 104 is also associated with another computing device 102(2), depicted as a desktop computer. The computing device 102(2) includes a social media module 118, configured to provide access to one or more social media websites 120 by way of connection to the network(s) 108. The social media module 118 may include executable program code, electronic circuitry, or other elements or constituency.

One illustrative and non-limiting operation is as follows: The user 104 accesses the server 110 using the computing device 102(1) and browses various kinds of content 114 available for purchase and acquisition. For instance, the content 114 may include various novels or other literary works, respective movies or audio books, narrative presentations, academic subject matter, or other material. The user 104 selects a particular content 114(1), which is an e-book titled "The Stormy Night", and provides information or data as needed for purchase. Such information may include the name "Steve" of the user 104, credit card or other payment information, electronic addresses for the computing devices 102(1) and 102(2), and so on.

The server 110 responds by providing the content 114(1) for the selected e-book to the computing device 102(1) by way of the network(s) 108. The content 114(1) is received by the computing device 102(1) and stored in non-transitory storage media by operation of the presentation module 106. The user 104 then initiates presentation of the content 114(1) by way of the computing device 102(1). The user 104 then consumes an initial portion of the content 114(1), such as the first 10 pages or so. The user 104 then closes the e-book on the computing device 102(1) and returns to other activities.

The computing device 102(1) communicates the present consumption status, or location, of the user 104 within the content 114(1) to the server 110. In turn, the content module 112 of the server 110 accesses the immersive content 116 and finds predefined material corresponding to the consumption status of the user 104. The server 110 then communicates the selected immersive content 116(1) to the social media website 120. In particular, the immersive content 116(1) is addressed to the user 104 "Steve" and is formatted to appear as being sent from one of the characters in the content 114(1).

Two hours later, as depicted by the time arrow 122, the user 104 uses the computing device 102(2) to access the social media website 120. Therein, the user 104 observes an actual social media post 124 from a friend "David", regarding a recent fishing trip. The user 104 further observes the immersive content 116(1), which is formatted as a social media post. Specifically, the immersive content 116(1) appears to be posted by "Mike", a character within the story of the content 114(1). Furthermore, the immersive content 116(1) encourages the user 104 "Steve" to prepare for a fictitious storm that is supposedly moving in his direction.

In this way, the immersive content 116(1) gives the user 104 additional engagement with the content 114(1), and is germane to the present situation in the story where the user 104 left off. Thus, the user 104 enjoys a brief experience related to the content 114(1), fostering continued excitement about the corresponding story when the user 104 is involved in other activities and cannot consume the content 114(1) directly.

The illustrative operation described above includes the provision of immersive content 116(1) that is formatted and communicated through the network(s) 108 so as to arrive as a social media post. However, respective immersive content 116 portions may be provided to the user 104 as text messages to a cellular phone, as e-mail transmissions, as "pop-up" messages that appear while consuming the corresponding content 114, and so on. Furthermore, either the content 114, the immersive content 116, or both, may include text, computer-generated images, photographs, animation sequences, video clips, audio files or music, verbal narration, or other forms of communication.

Figure 2:
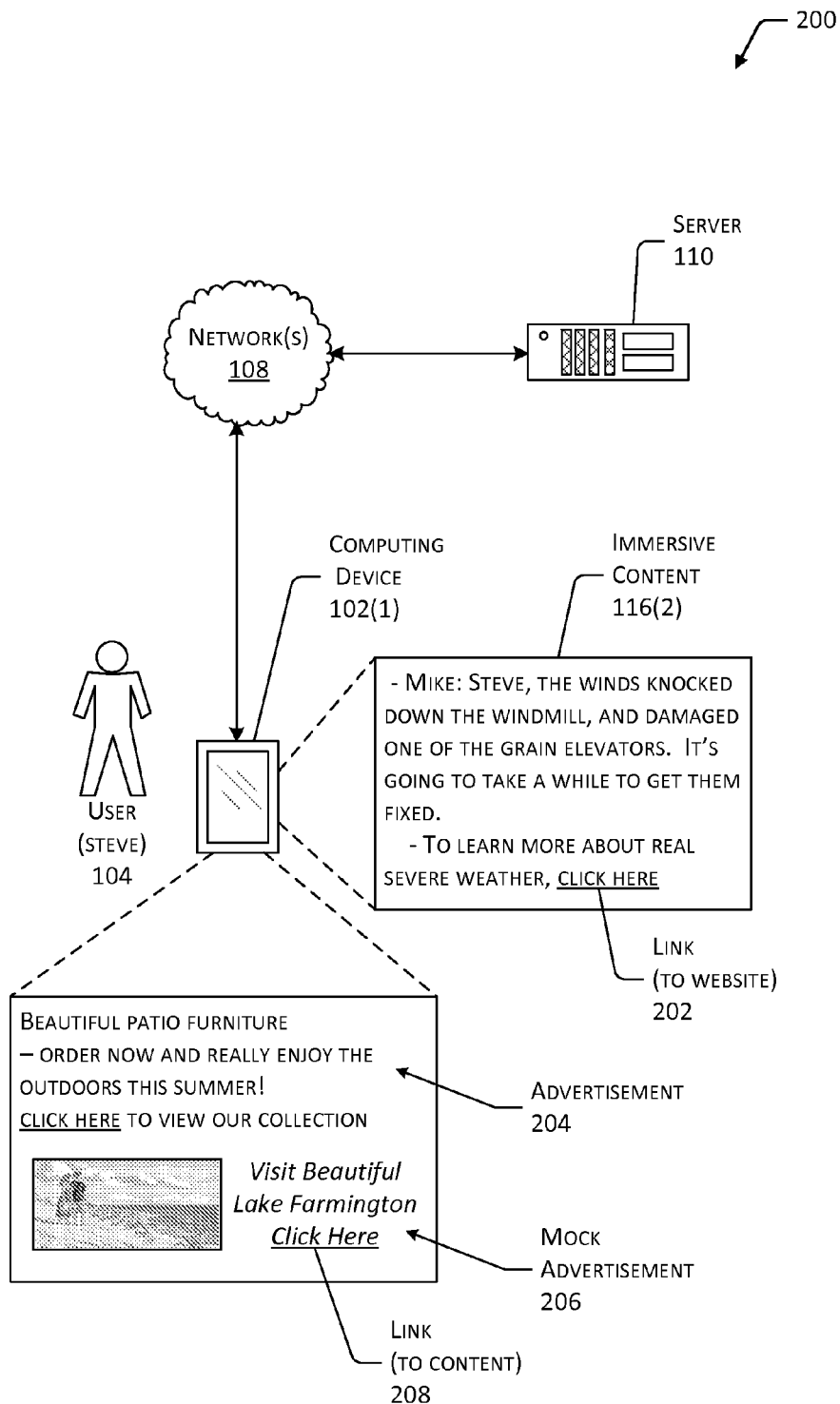
FIG. 2 depicts views including immersive content and a mock advertisement that corresponds to content.

FIG. 2 depicts views 200 including respective types of immersive content 116, elements thereof, and operations that may be performed using each. The views 200 are illustrative and non-limiting in nature, and other elements, devices, systems, or respective operations are also contemplated.

As depicted, the server 110 has communicated immersive content 116(2) to the computing device 102(1). For instance, the immersive content 116(2) is related to the content 114(1), the e-book titled "The Stormy Night". The immersive content 116(2) appears as a pop-up message on the computing device 102(1), perhaps while the user 104 is using an application other than the e-book reader. Other presentation operations or formats may also be used.

In particular, the immersive content 116(2) refers to fictitious structures damaged by high winds, which are germane to the story of the content 114(1). Also depicted is a link 202 that appears immediately following the immersive content 116(2). Actuating the link 202 may take the user 104 to a website or webpage regarding severe weather, a topic corresponding to the immersive content 116(2). The website corresponding to the link 202 may be hosted or provided by the server 110, or may be provided by another computing device 102 or a resource accessible by way of the network(s) 108. In this way, the user 104 may pursue additional information on topics of interest that arise as a result of consuming the content 114(1).

Further depicted is an advertisement 204 regarding patio furniture. The advertisement 204 may also include a link to a corresponding website. The advertisement 204 may be received by way of the network(s) 108 and presented by the computing device 102(1). The advertisement 204 may be provided or presented in accordance with one or more of the methods described in U.S. patent application Ser. No. 13/945,745, titled "LEVERAGING AD RETARGETING FOR UNIVERSAL EVENT NOTIFICATION", as filed on 18 Jul. 2013, and naming Jon Aaron McClintock as sole inventor, which is hereby incorporated by reference in its entirety. Other suitable methods for providing or presenting the advertisement 204 may also be used. For instance, the teachings of U.S. patent application Ser. No. 13/945,745 may be applied to messages or e-mail communications that appear to originate from a character within the content 114(1).

A mock advertisement 206 may also appear adjacent to the advertisement 204. The mock advertisement 206 may be formatted and presented to appear as a real advertisement, and may include text, images, digital renderings, audio clips, or other material related to or suggestive of particular content 114 that the user 104 is consuming, or that is available for acquisition and consumption. In turn, a link 208 may be used to access content 114 corresponding to the mock advertisement 206, such as the particular content 114(1), or other matter that the user 104 may be interested in.

In one example, the mock advertisement 206 may be presented on the social media website 120, alongside of the advertisement 204 or other similar material. Other presentation locations or methods may also be used. The user 104 may then view the mock advertisement 206, which includes a graphic image and text regarding "Lake Farmington", a location within the story of the content 114(1). In one instance, activation of the link 208 may take the user 104 to a website provided by the server 110 corresponding to the content 114(1). In another instance, activation of the link 208 may initiate an e-book application on the computing device 102(1) and present that portion of the content 114(1) corresponding to "Lake Farmington". Other operations may also be triggered by way the link 208.

The mock advertisement 206 or the link 208, or both, may be used to further user 104 enjoyment of the content 114(1). Alternatively, the mock advertisement 206 or link 208 may be used to expose the user 104 to the content 114(1) or other content 114 for the first time. From one perspective, the mock advertisement 206 may be considered a form of immersive content 116, and is used to foster user 104 enjoyment during times when the corresponding primary content 114 is not being consumed. Thus, immersive content 116 may be provided having non-commercial information or elements, and may or may not be formatted or presented so as to suggest a real advertisement.

Figure 3:
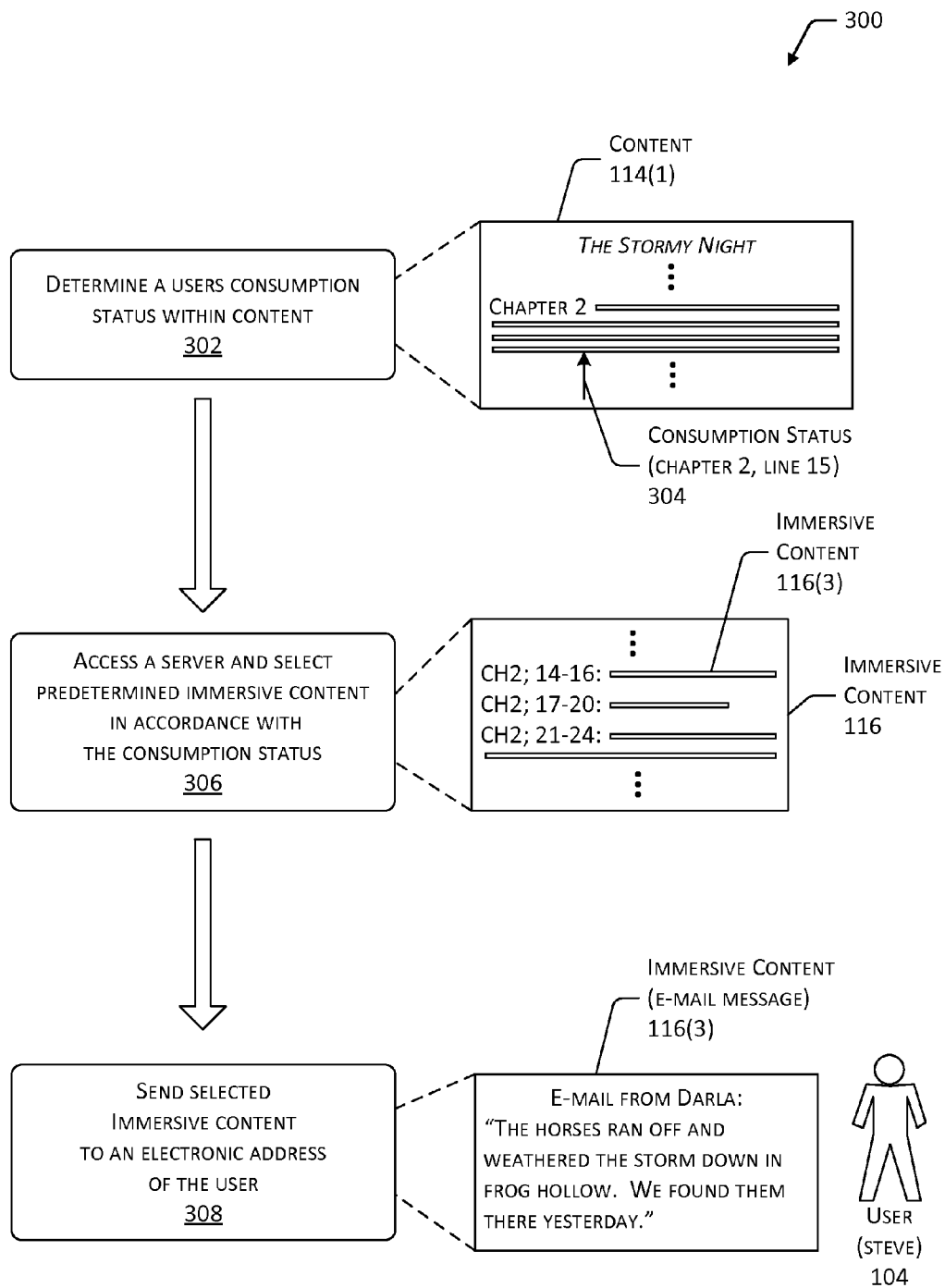
FIG. 3 depicts views of a process including providing immersive content based on a consumption status of a user within content.

FIG. 3 depicts views 300 of a process including the provision of immersive content. The views 300 are illustrative and non-limiting in nature, and other elements, devices, systems, or respective operations are also contemplated.

Block 302 determines a user's 104 consumption status within content 114. For purposes of a present example, the user 104 is consuming the content 114(1). The presentation module 106, which may include an e-book application, tracks the consumption status 304 of the user 104 within the content 114(1) by way of a pointer or other device. As depicted, the user 104 left off at chapter 2, line 15, of the content 114(1) during their most recent consumption session. Other content 114 consumption tracking or quantification methods may also be used, such as number of textual words presented thus far, a time index within a video or audio presentation, a greatest page number accessed so far, and so forth.

Block 306 accesses a server 110 and selects predetermined immersive content 116 in accordance with the consumption status 304. In the present example, the content module 112 of the server 110 accesses the immersive content 116 and searches for a predefined immersive content 116 portion that corresponds to the consumption status 304. As depicted, a particular immersive content 116(3) corresponds to a consumption status within chapter 2, lines 14-16, which is consistent with the present consumption status 304 of the user 104. Thus, the content module 112 selects and retrieves the immersive content 116(3) from non-transitory storage media.

The immersive content 116 may also be selected in accordance with factors other than, or in addition to, the consumption status 304. For instance, if the content 114(1) conveys information or a storyline regarding a specific geographic place that is near to a location of the user 104, then immersive content 116 regarding that place may be selected. In another instance, if a significant real-world event has recently occurred, such as a hurricane, then immersive content 116 may be selected that relates similar elements or details. In yet another instance, immersive content 116 may be selected based on the present season of the year, a near-future holiday or observance, or in accordance with other points of consideration. Other immersive content 116 selection criteria may also be used.

Block 308 sends the selected immersive content 116(3) to an electronic address of the user 104. In the present example, the immersive content 116(3) may be provided to an e-mail address of the user 104 and appears as a message from "Darla", a character of the story of the content 114(1). As depicted, the immersive content 116(3) conveys details regarding the storyline of the content 114(1) where the user 104 left off. Other immersive content 116 may also be used, formatted as ideas or private thoughts of the respective characters, expressing doubts or posing questions, or using other literary techniques or presented in other interesting ways. The user 104 continues to enjoy vignettes and insights into the content 114(1) when such is not being actively consumed, by way of the immersive content 116.

In another instance, a consumption status 304 of the user 104 may be collected in an "offline" manner and used for various purposes. For example, if the user 104 is reading a paperback book, the user 104 may place an electronic bookmark at a location within the book where they left off. The electronic bookmark may comprise one or more of the elements described with regard to computing device 102, such as a processor, memory, and so forth. The bookmark may scan portions of both adjacent pages and send scanned images or corresponding data to the server 110. Those images or data may be used to identify or infer the particular book the user 104 is reading and where they left off. Such information may then be used to communicate offers for other books, e-books, or other content 114 from the server 110 to a computing device 102 of the user 104, by way of surface mail, or in other suitable ways. In another instance, the user 104 may enter information regarding their present place within the book by way of user input device.

In yet another instance, immersive content 116 may be provided by way of a physical item. For example, consumption status 304 communicated to the server 110 may trigger the sending of a letter or other item to the user 104 by surface mail, or as part of a shipment or parcel. The letter or shipment, which may correspond to merchandise purchased in online commerce, may include a token item, written passage, a handbill, a novelty item, an artifact, or other object of interest corresponding to the story where the user 104 left off at. Other ways of providing immersive content 116, in either physical or electronic ways, may also be used.

Figure 4:
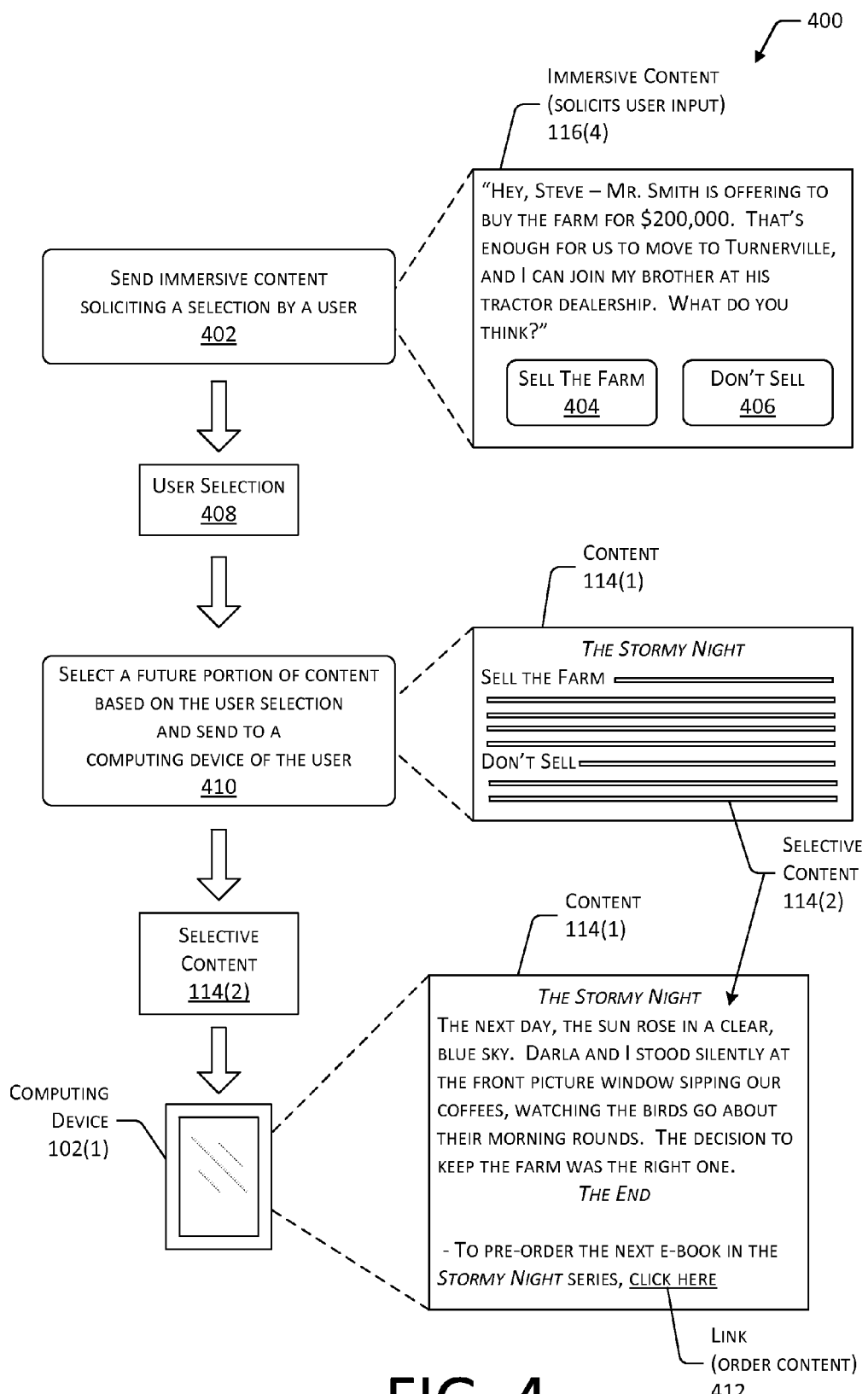
FIG. 4 depicts views of a process including providing immersive content that solicits user input, and providing a portion of the content based on the user's response to the solicitation.

FIG. 4 depicts views 400 of a process including the provision of immersive content that solicits a user selection. The views 400 are illustrative and non-limiting in nature, and other elements, devices, systems, or respective operations are also contemplated.

Block 402 sends immersive content 116 soliciting a selection by a user 104. For purposes of a present example, the server 110 sends immersive content 116(4) to the computing device 102(1) so to foster the interest of the user 104. The immersive content 116(4) may be formatted for presentation by the presentation module 106 as a pop-up message, as an e-mail, or in another suitable manner. As depicted, the immersive content 116(4) relates to the content 114(1). In particular, the immersive content 116(4) requests user 104 input in regard to selling or not selling "the farm", which is an aspect or feature of the story of the content 114(1).

A "Sell the Farm" input device 404, and a "Don't Sell" input device 406, are included with the immersive content 116(4), representing mutually exclusive selections that the user 104 may choose. The user 104 may actuate or click on one or the other of the input devices 404 and 406, but not both. Other input devices corresponding to other user choices may also be used. For purposes of this illustration, it is assumed that the user 104 activates the "Don't Sell" input device 406. As a result, a user selection 408, corresponding to the "Don't Sell" selection, is communicated back to the server 110 by way of the networks 108.

Block 410 selects a future portion of content 114 based on the user selection 408 and sends it to the users computing device 102(1). In the present example, the content module 112 receives the user selection 408 and uses it to select a predefined, selective content 114(2) that is a portion, or a continuation, of the content 114(1). As depicted, the selective content 114(2) is retrieved from storage and communicated from the server 110 to the computing device 102(1).

The selective content 114(2) is received by the presentation module 106 and used to amend the previously received content 114(1). In one instance, the selective content 114(2) is added as a final portion of the content 114(1). In another instance, the selective content 114(2) is used to replace a predefined final portion of the content 114(1). In this way, the content 114(1) may be modified, or not, based on whether or not the user 104 responds to the immersive content 116(4). That is, the original storyline of the content 114(1) may be left undisturbed if the user 104 does not actuate either of the input devices 404 or 406. Alternatively, the storyline may be modified in accordance with the user 104 selection. In this case, the content 114(1) is changed or amended in accordance with the selective content 114(2). Other portions of the content 114(1) may be amended or altered in accordance with selective content 114 sent in accordance with a user 104 input.

Also depicted is a link 412 that appears immediately following the selective content 114(2). Actuating the link 412 may take the user 104 to a website or webpage where additional content may be purchased, acquired, pre-ordered, and so forth. As depicted, the link 412 relates to pre-ordering another literary work in a series including the e-book "The Stormy Night". The website corresponding to the link 412 may be hosted or provided by the server 110, or may be provided by another computing device 102 or resource accessible by way of the network(s) 108.

In another example, the selective content 114(2) may include instructions, machine-executable code, or other information configured to cause an audio system, home automation system, or other device to perform particular actions or to present certain portions of the content 114(2). For example, the selective content 114(2) may include an audio file that includes thunder claps, heavy rain, high wind, or other sounds that may be presented by an output device of the computing device 102(1). In another example, the selective content 114(2) may include code that is communicated from the computing device 102(1) to a home automation system, wherein home lighting levels are reduced in accordance with a night time situation being described within the selective content 114(2). Other operations may also be triggered or controlled by way of encoding or data included with the selective content 114(2).

Figure 5:
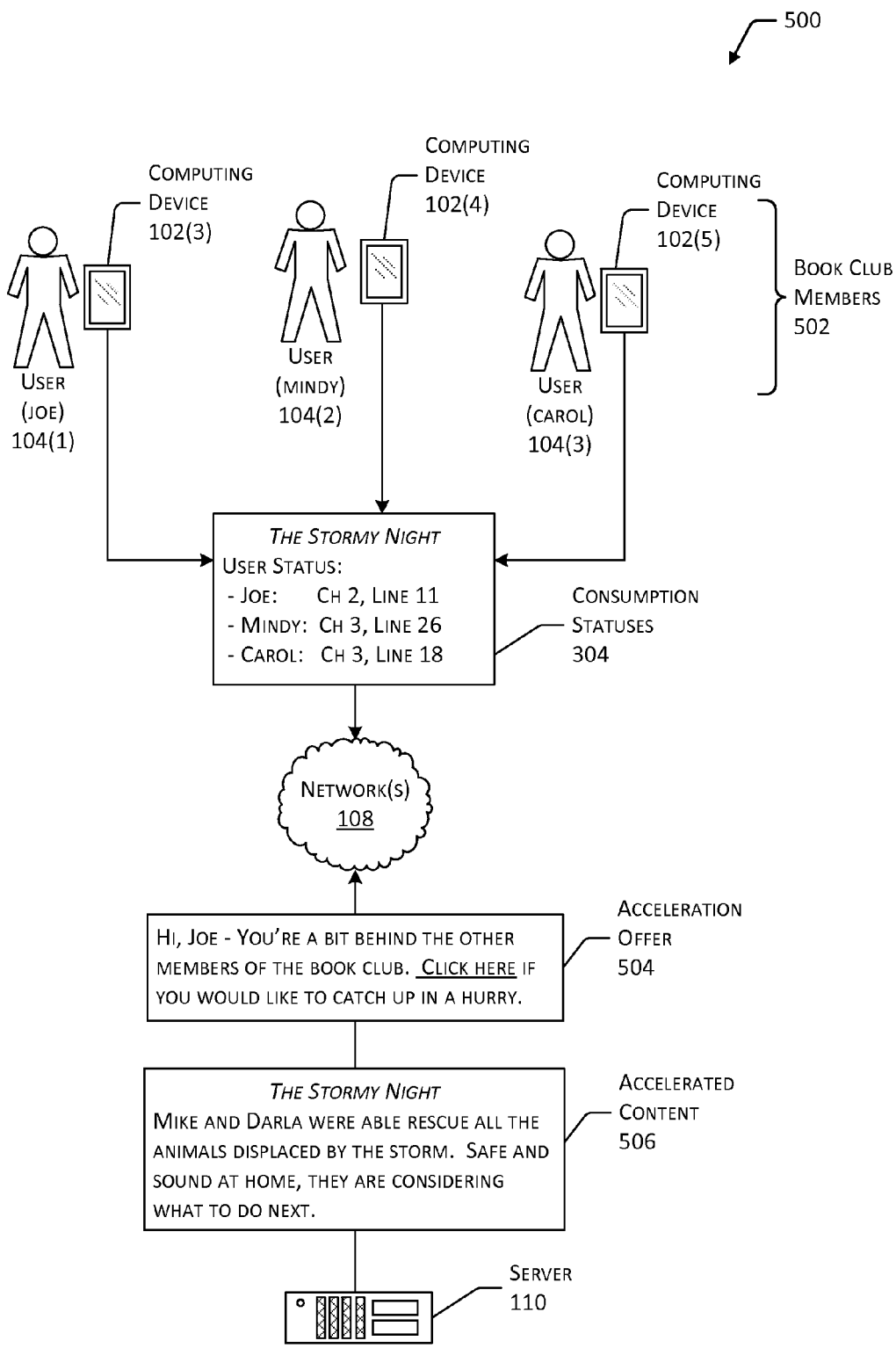
FIG. 5 depicts views including plural users consuming the same content, and providing accelerated content to one of the users based on their consumption status.

FIG. 5 depicts views 500 of a process including the provision of accelerated content to a user that is part of a group. The views 500 are illustrative and non-limiting in nature, and other elements, devices, systems, or respective operations are also contemplated.

Three respective computing devices 102(3), 102(4), and 102(5) are depicted as tablet computers. Other types of computing device 102 may also be used. In turn, a first user 104(1) "Joe" is associated with the computing device 102(3), a second user 104(2) "Mindy" is associated with the computing device 102(4), and a third user 104(3) "Carol" is associated with the computing device 102(5). The respective users 104(1)-104(3) define book club members 502.

Each of the computing devices 102(3)-102(5) includes a resource or resources, such as a respective presentation module 106, which is configured to track a consumption status 304 within the content 114(1) for each of the corresponding users 104(1)-104(3). Thus, three respective consumption statuses 304 are depicted. For instance, "Joe" is presently depicted at chapter 2, line 11, of the content 114(1), while "Mindy" and "Carol" are at chapter 3, line 26, and chapter 3, line 18, respectively. As such, the user 104(2) "Mindy" has consumed the greatest amount of the content 114(1), while the user 104(1) "Joe" has consumed the least amount of the content 114(1).

The server 110 may be configured to recognize that the users 104(1)-104(3) are associated as the book club members 502. The respective computing devices 102(3)-102(5) may be further configured to communicate their respective consumption statuses 304 to the server 110 by way of the one or more networks 108. The server 110 receives the consumptions statuses 304 and compares them, determining the user 104(1) "Joe" is lagging behind both "Mindy" and "Carol", with respect to consuming the content 114(1).

The server 110 may then generate an acceleration offer 504 that is communicated to the computing device 102(3) and presented to the user 104(1), "Joe". In particular, the acceleration offer 504 may indicate that the user 104(1) is behind the other book club members 502, and offer to provide the opportunity to "catch up" with the other users 104(2)-104(3). The acceleration offer 504 may also include a user input device, such as a clickable tool, so that the user 104(1) may communicate their acceptance of the acceleration offer 504 back to the server 110. For purposes of the present illustration, it is assumed that the user 104(1) "Joe" clicks on the input device and accepts the acceleration offer 504.

The server 110 then responds by selecting or generating accelerated content 506 that corresponds to that portion of the content 114(1) between chapter 2, line 11, and chapter 3, line 26. The accelerated content 506 may include pertinent details of the corresponding story or media content 114(1), an abbreviated or condensed version of the intervening content 114(1), an abstract of the intervening content 114(1), and so on. Text, images, audio material, or other content may be included in the accelerated content 506. Generally, the accelerated content 506 is intended to relate information that is key to the storyline or informational path of the content 114(1) in a relatively brief and concise manner. In one instance, the accelerated content 506 is selected from numerous respective portions of accelerated content 506 that are predefined in accordance with respective portions of the content 114(1). Other accelerated content 506 generating or pre-designation methods may also be used.

The server 110 then provides the accelerated content 506 to the computing device 102(3), where it is received and presented to the user 104(1) by the presentation module 106. The user 104(1) "Joe" may now view or consume the accelerated content 506 so as to gain a general understanding of the content 114(1) up to the point where the other users 104(2) and 104(3) are at, or approximately so. In another instance, the server 110 may communicate a message to the computing devices 102(4) and 102(5) of the users 104(2) "Mindy" and 104(3) "Carol" requesting that they not reveal the intervening portion of the content 114(1) to the user 104(1) "Joe".

The use of accelerated content 506 may help a user 104 to continue enjoying a literary work or other media material while staying involved as a member of a group or association. In one instance, accelerated content 506 may be provided to a student or students in an academic class, to employees undergoing various work-related training programs, or in accordance with other situations. Furthermore, respective acceleration offers 504 may be triggered based on selectable consumption status 304 values, an elapsed time since a particular user 104 has consumed particular content 114, and so forth. For instance, an acceleration offer 504 may be sent to a user 104 if the server 110 determines that the particular user 104 has not consumed any of a content 114 for more than 2 weeks. Other triggering methodologies may also be used.

Figure 6:
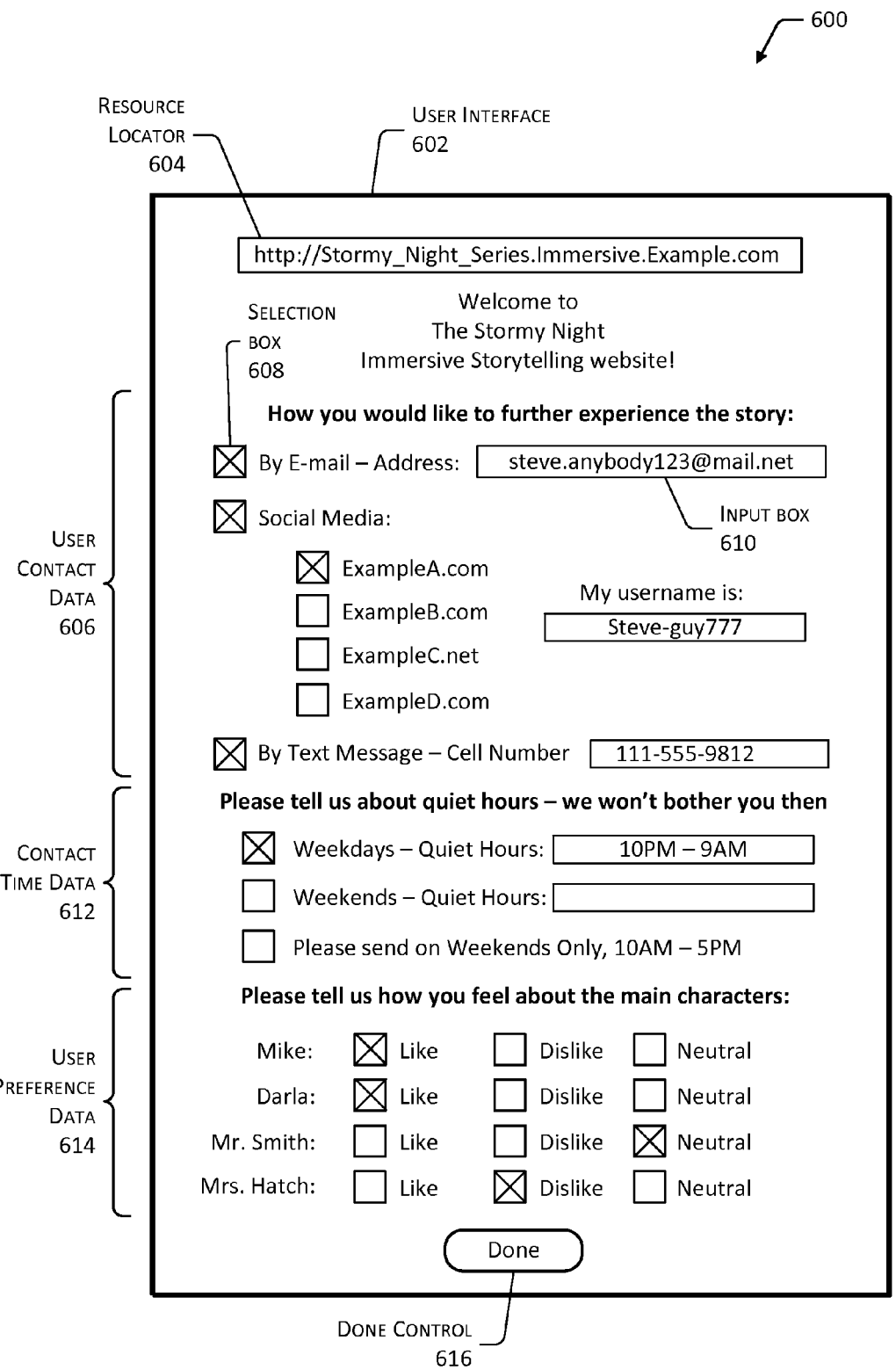
FIG. 6 depicts views of a user interface for acquiring user input regarding content and the provisioning of immersive content.

FIG. 6 depicts views 600 including a user interface 602 and respective elements thereof. The views 600 are non-limiting in nature, and other elements, user interfaces, devices, items, or operations are also contemplated.

The user interface 602 may include or indicate a resource locator 604 corresponding to a website provided by the server 110. In one instance, the user interface 602 is provided or hosted by the content module 112, and is configured to run on the computing device 102(1). As depicted, the user interface 602 is configured to acquire user 104 input corresponding to the content 114(1), the e-book titled "The Stormy Night", such that related immersive content 116 may be provided. Other user interfaces specifically corresponding to other content 114 may also be used.

The user interface 602 may include user contact data 606, wherein the user 104 may select or specify one or more modes or avenues of communication for receiving immersive content 116. In one instance, e-mail may be selected by way of a selection box 608, and a corresponding electronic address for the user 104 may be provided by way of a input box 610. By analogous mechanisms, one or more social media websites 120 may be selected, and a username or other account identifier may be input. In turn, a cellular phone number may be input by the user 104 such that immersive content 116 may be provided as text messages. Selections or inputs corresponding to other modes of communication may also be provided in the user contact data 606.

The user interface 602 may also include contact time data 612, such that particular days of the week, times of day, or combinations of these may be selected or specified when immersive content 116 may or may not be provided to the user 104. As depicted, the user 104 has provided input indicating that immersive content 116 should not be communicated on weekdays between the hours of 10 PM and 9 AM. Thus, "quiet hours" have been specified by the user 104. The server 110 may be configured not to send any e-mail messages, post to social media, and so on, such that immersive content 116 is provided to the user 104. In turn, an illustrative "weekends only" selection may also be chosen. Other day or time selections or inputs may also be used.

The user interface 602 may further include user preference data 614, such that particular characters or aspects of the content 114(1) may be selected, ranked, or classified in accordance with user 104 taste or affinity. As depicted, the user 104 has indicated that the respective characters "Mike" and "Darla" are liked, that the character "Mrs. Hatch" is disliked, and that the character "Mr. Smith" is neither liked nor disliked—that is, "Mr. Smith" is held in neutral regard by the user 104.

The user preference data 614 may be used to determine what immersive content 116 is subsequently sent to the computing device or devices 102 of the user 104, the formatting, tone, apparent source, or subject matter of immersive content 116 portions or messages, and so on. For example, if the user 104 indicates that the character "Mike" is liked, while all other characters are disliked, then immersive content 116 may be provided thereafter that appears to be sent by "Mike" to the user 104, has a positive or collegial tone, and so on. Conversely, immersive content 116 that appears to be sent by the character "Mrs. Hatch" may be negative or accusatory in nature, and so forth, in accordance with the user 104 alignment against "Mrs. Hatch". The user preference data 614 may be used in other respective ways, as well.

For instance, a user 104 may spend a relatively longer period of time viewing a certain passage, page, or other aspect of the content 114(1), or may dwell over a certain portion of the content 114(1) using a pointer or other virtual tool. Particular characters, circumstances, or other matter within than particular portion of the content 114(1) may be of special interest to the user 104. In another instance, a forward-looking camera of the computing device 102(1) may detect that the eyes of the user 104 spends extra time viewing particular matter within the content 114(1). These and other techniques may be used to derive or infer user preference data 614, as well.

The user interface 602 may also include other input devices, output devices, or controls, such as a done control 616. The done control 616 may be configured to cause the user 104 selections and inputs to the user interface 602 to be communicated from the computing device 102(1) to the server 110. The content module 112 may be configured to perform various operations, select or provide immersive content 116, and so on, in accordance with the selections and inputs made using the user interface 602. The selection box 608, the input box 610, the done control 616, or other devices of the user interface 602 may be actuated by way of touch gesturing, mouse clicking, keyboard entry, or other suitable input techniques.

The user interface 602, or a similar user interface, may be presented by way of the computing device 102(1) or another device after a predetermined amount of the corresponding content 114(1) has been consumed, such as indicated by a consumption status 304. That is, the user interface 602 may be presented once the user 104 has consumed sufficient content 114(1) to form perspectives or dispositions with respect to the characters of a story, and so on. Additionally, as the user 104 consumes more of the content 114(1), new characters may be introduced in the story, their circumstance may change, different challenges may present themselves or be resolved, and so on. As a result, the user interface 602 may be amended accordingly and presented to the user 104 periodically so that new input and preferences may be acquired for use toward selecting or providing immersive content 116.

Figure 7:
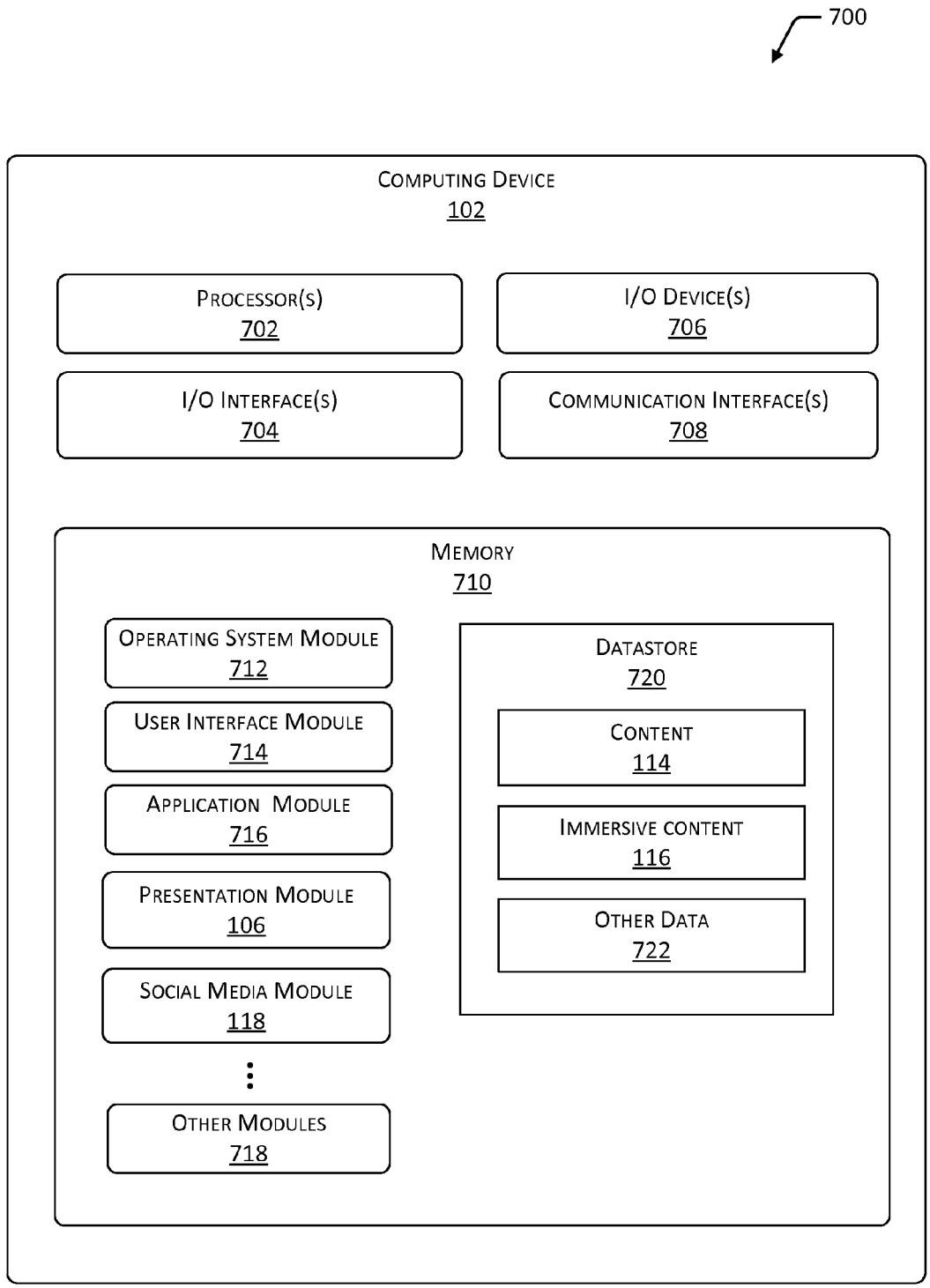
FIG. 7 is a block diagram depicting a computing device.

FIG. 7 illustrates a block diagram 700 of a computing device 102. The computing device 102 is illustrative and non-limiting, and may be defined by a tablet computer, an e-book reader, a desktop computer, a wearable computer, a media device, a cellular phone, a laptop computer, or another suitable apparatus. The computing device 102, or functions or constituents thereof, may also be included within a vehicle or other device or system. The computing device 102 may include one or more processors 702 configured to execute one or more stored instructions. The processor(s) 702 may comprise one or more cores, and may also be referred to as hardware processors.

The computing device 102 may include one or more I/O interface(s) 704 to allow the processor(s) 702 or other portions of the computing device 102 to communicate with various other computing devices 102, other user devices, the server 110, or other servers, various web-based resources, and so on. The I/O interfaces 704 may be configured to operate in accordance with various protocols such as I2C, SPI, USB, RS-232, and so forth.

The I/O interface(s) 704 may couple to one or more I/O devices 706. The I/O devices 706 may include one or more input devices such as a keyboard, a mouse, a microphone, a digital camera, user input buttons, and so forth. The I/O devices 706 may also include output devices such as one or more displays, audio speakers, haptic output devices, and so forth. The I/O devices may also include respective navigation resources such as, without limitation, satellite-based navigation or positioning such as the global positioning system (GPS) or the global navigation satellite system (GLONASS), cellular tower-based locating, inertial navigation devices or systems, radio-based navigation, one or more navigational gyroscopes, and so on. In some embodiments, the I/O devices 706 may be physically incorporated within the computing device 102, or they may be externally placed. The I/O devices 706 may include various other devices, as well.

The computing device 102 may also include one or more communication interfaces 708. The communication interfaces 708 are configured to provide communications with other computing device 102, web-based resources, servers 110, routers, wireless access points, network access satellites, cellular towers, and so forth. The communication interfaces 708 may include wireless functions, devices configured to couple to one or more networks including LANs, Wireless-LANs, WANs, Wireless-WANs, and so forth. The computing device 102 may also include one or more busses or other internal communications hardware or software that allow for the transfer of data between the various modules and components of the computing device 102. The computing device 102 may also include one or more batteries, rechargeable batteries, or other energy storage devices, such that the computing device 102 may be used in a portable or mobile manner.

The computing device 102 includes one or more memories 710. The memory 710 comprises one or more computer-readable storage media (CRSM). The memory 710 provides storage of computer readable instructions, data structures, program modules, and other data used during the operation of the computing device 102. The memory 710 may include at least one operating system (OS) module 712. Respective OS modules 712 are configured to manage hardware devices such as the I/O interfaces 704, the I/O devices 706, the communication interfaces 708, and provide various services to applications or modules executing on the processors 702.

Also stored in the memory 710 may be one or more of the following modules. These modules may be executed as foreground applications, background tasks, and so forth. A user interface module 714 may be configured to provide or present one or more user interfaces 602, and may also provide one or more application programming interfaces. The user interface module 714 may be configured to operate with information encoded as hypertext markup language ("HTML") files, extensible markup language ("XML") files, or in another suitable format or language. The user interface module 714 may be configured to accept inputs and send outputs using the I/O interfaces 704, the communication interfaces 708, or both.

The memory 710 may also store one or more application modules 716. Non-limiting examples of the application modules 716 include a word processing application, a spreadsheet application, a technical drawing or illustrating application, a photo editing application, a web browsing application, a portable document viewing application, and so on. The memory 710 may also include the presentation module 106 or the social media module 118 as respectively described elsewhere herein. The memory 710 may also include one or more other modules 718. Non-limiting examples of the other modules 718 may include cellular communications circuitry, a watchdog or other timer, a wireless internet transceiver, hardware resources for satellite communications or navigation, and so forth.

The memory 710 may also include a datastore 720 to store information. The datastore 720 may use a flat file, database, linked list, tree, executable code, or other data structure to store the information. In some implementations, the datastore 720 or a portion of the datastore 720 may be distributed across one or more other computing devices 102 or other devices including servers 110, network attached storage apparatus, and so forth.

The datastore 720 may store one or more data structures including content 114. The content 114 may include the specific content 114(1), or other literary works, videos, movies, audio files, and so on. Thus, the content 114 within the datastore 720 may include one or more e-books, various movies or audio narrations, or other types of user-consumable content or media.

The datastore 720 may also store one or more data structures including immersive content 116, such as the immersive content 116(1) formatted as a social media post, the immersive content 116(2) formatted as a message, and so forth. The mock advertisement 206 or aspects thereof may also be stored with the immersive content 116, as well. The datastore 726 may also store other data 722. For example, the other data 722 may include one or more data structures that may be queried, modified, amended, and so forth. The other data 722 may also include one or more advertisements 204, one or more mock advertisements 206, one or more predetermined portions of accelerated content 506, contact or preferences information for one or more users 104, encryption keys or codes, and so forth. Accordingly, respective computing devices 102 may be resourced and configured to perform numerous functions, as well as to cooperate with one or more other computing devices 102 or apparatus.

Figure 8:
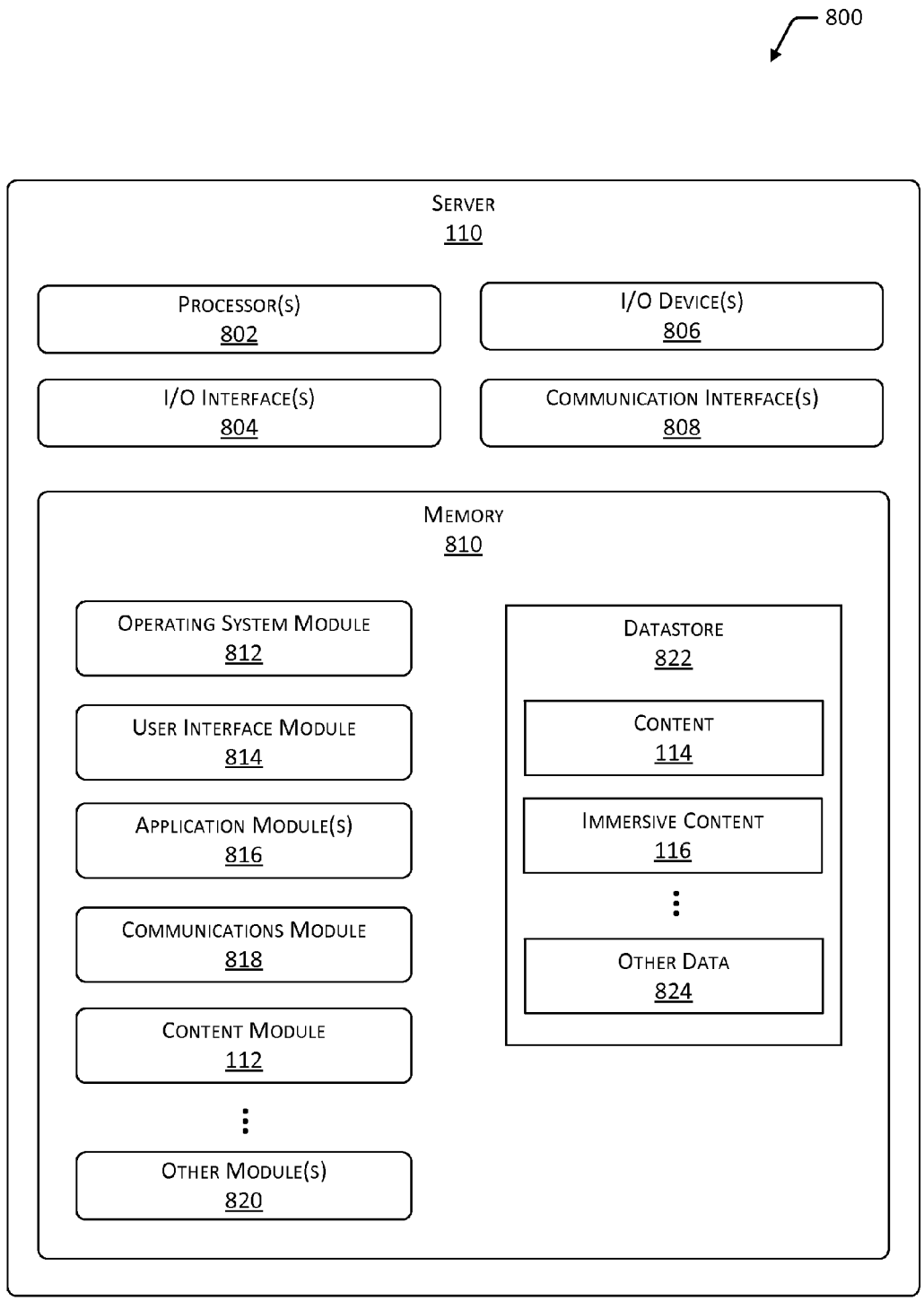
FIG. 8 is a block diagram depicting a server.

FIG. 8 illustrates a block diagram 800 of a server 110. The server 110 is illustrative and non-limiting, and may be defined by a rack-mounted server or another suitable apparatus. The server 110 may include one or more processors 802 configured to execute one or more stored instructions. The processor(s) 802 may comprise one or more cores, and may also be referred to as hardware processors.

The server 110 may include one or more I/O interface(s) 804 to allow the processor(s) 802 or other portions of the server 110 to communicate with various computing devices 102, other servers 110, user devices, web-based resources, and so on. The I/O interfaces 804 may be configured to operate in accordance with various protocols such as I2C, SPI, USB, RS-232, and so forth.

The I/O interface(s) 804 may couple to one or more I/O devices 806. The I/O devices 806 may include one or more input devices such as a keyboard, a mouse, a microphone, a camera, user input buttons, and so forth. The I/O devices 806 may also include output devices such as one or more displays, audio speakers, haptic output devices, and so forth. In some embodiments, the I/O devices 806 may be physically incorporated within the server 110, or they may be externally placed.

The server 110 may also include one or more communication interfaces 808. The communication interfaces 808 are configured to provide communications with other servers 110, various computing devices 102, web-based resources, routers, wireless access points, and so forth. The communication interfaces 808 may include wireless functions, devices configured to couple to one or more networks including LANs, Wireless-LANs, WANs, Wireless-WANs, and so forth. The server 110 may also include one or more busses or other internal communications hardware or software that allow for the transfer of data between the various modules and components of the server 110.

The server 110 includes one or more memories 810. The memory 810 comprises one or more CRSM. The memory 810 provides storage of computer readable instructions, data structures, program modules, and other data for the operation of the server 110. The memory 810 may include at least one operating system (OS) module 812. Respective OS modules 812 are configured to manage hardware devices such as the I/O interfaces 804, the I/O devices 806, the communication interfaces 808, and provide various services to applications or modules executing on the processors 802.

Also stored in the memory 810 may be one or more of the following modules. These modules may be executed as foreground applications, background tasks, and so forth. A user interface module 814 may be configured to generate or provide one or more user interfaces, such as the user interface 602, or characteristics or variants thereof, in accordance with control signals or information input from the content module 112. The user interface module 814 may also provide one or more application programming interfaces. The user interface module 814 may be configured to operate with information encoded as hypertext markup language ("HTML") files, extensible markup language ("XML") files, or in another suitable format or language. The user interface module 814 is configured to accept inputs and send outputs using the I/O interfaces 804, the communication interfaces 808, or both.

The memory 810 may also store one or more application modules 816. Non-limiting examples of the application modules 816 include a word processing application, a data encrypting or decrypting application, a data structure generation or management application, a web browsing application, a portable document generating or viewing application, and so on.

The memory 810 may further store a communications module 818 such that content 114, immersive content 116, the user interface 602, user input or selections from the user interface 602, or other information or data, may be communicated to and from respective computing devices 102. In one example, the communications module 818 includes executable program code, electronic circuitry, or other resources used to transmit and receive wireless signals, signals by way of wired or optical pathways, or in accordance with other techniques. The memory 810 may also store the content module 112 as described elsewhere herein.

The memory 810 may also include one or more other modules 820. Non-limiting examples of the other modules 820 may include cellular communications circuitry, a watchdog or other timer, a wireless internet receiver, secured data handling or communications resources, and so forth.

The memory 810 may also include a datastore 822 to store information. The datastore 822 may use a flat file, database, linked list, tree, executable code, or other data structure to store the information. In some implementations, the datastore 822 or a portion of the datastore 822 may be distributed across one or more other servers 110 or computing devices, network attached storage apparatus, and so forth.

The datastore 822 may store content 114, such as the content 114(1) of the e-book titled "The Stormy Night". The content 114 may include any suitable number of e-books, literary works, video or audio files, and so on, that may be selectively provided to respective computing devices 102. That is, a user 104 may access or purchase a given file or work within the content 114 for consumption by way of an associated computing device 102.

The datastore 822 may also store immersive content 116, such as the immersive content 116(1), 116(2), 116(3), and so on. The various portions of immersive content 116 are related or correspondent to respective portions of the content 114. For example, several portions of the immersive content 116 may be predefined in accordance with different aspects or parts of the content 114(1). The immersive content 116 is configured to be selectively provided to computing devices 102 in accordance with various operations or triggering events as described elsewhere herein. The datastore 822 may further store other data 824. For example, the other data 824 may include one or more data structures that may be queried, modified, amended, and so forth.

Figure 9:
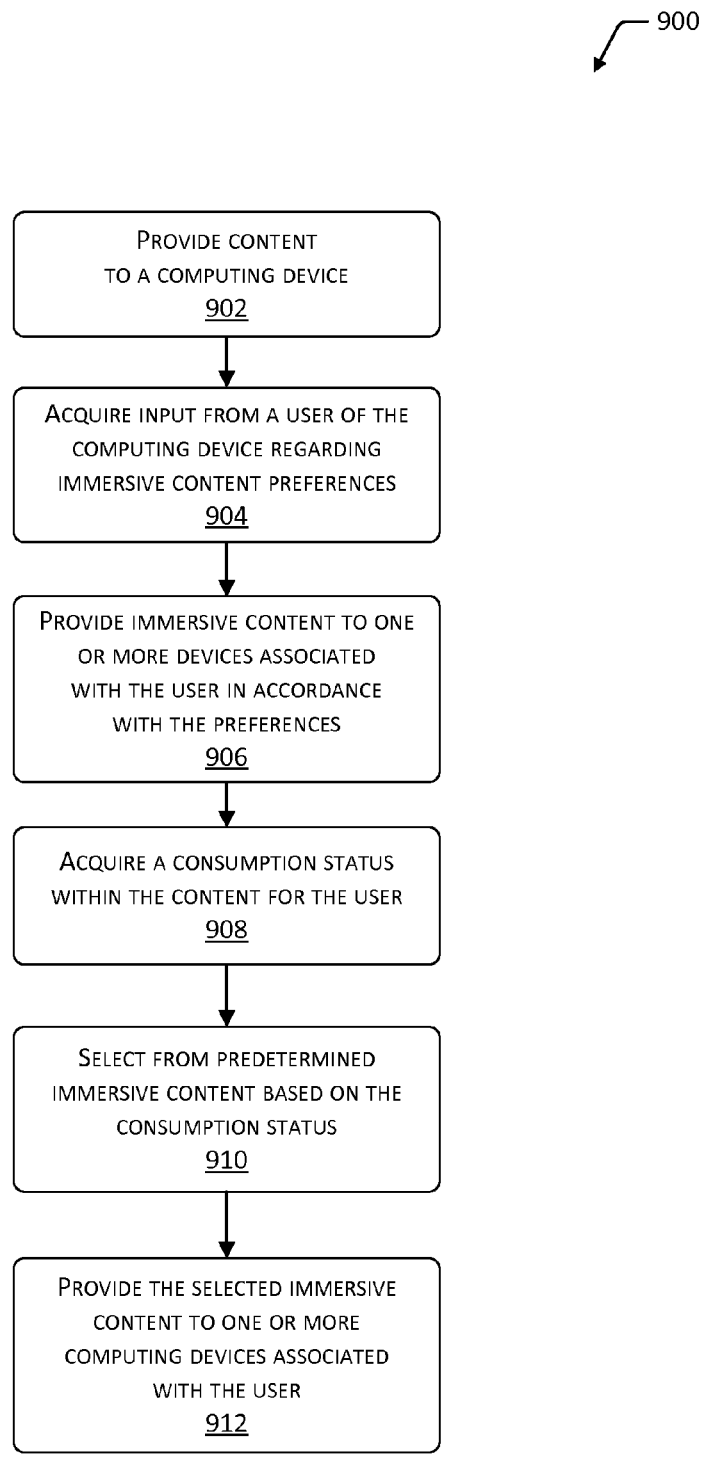
FIG. 9 is a flow diagram of an illustrative process including providing content and immersive content to a user.

FIG. 9 is a flow diagram 900 illustrating a process including the provision of content and immersive content to respect computing devices. The process of the flow diagram 900 is illustrative and non-limiting, and other processes including one or more other steps, omitting one or more of the depicted steps, or proceeding in other orders of execution, may also be used.

Block 902 provides content 114 to a computing device 102. For purposes of a present example, the user 104 "Steve" is using the computing device 102(1), which includes an e-book reader/presentation application. The user 104 uses the computing device 102(1) to access the server 110, and purchases an e-book titled "The Stormy Night". The corresponding content 114(1) is thereafter provided from the server 110 to the computing device 102(1), where it is stored in non-transitory storage memory 710.

Block 904 acquires input from a user 104 of the computing device 102 regarding immersive content 116 preferences. In the present example, the server 110 provides the user interface 602 to the computing device 102(1) sometime after the sending of the content 114(1). The user interface 602 includes various selections and devices such that the user 104 may provide data regarding their opinion of characters in the content 114(1), user 104 contact information, days or hours for contacting the user 104, and so on. Such input from the user 104, as gathered through the user interface 602, is then communicated back to the server 110 by way of the network(s) 108.

For instance, the user 104 may indicate that they prefer to receive e-mail messages at a specified electronic address, that immersive content 116 should be received only during weekend daytime hours, and that they have a particular affinity for the characters "Darla" and "Mike". Other kinds of user 104 preferences or information may also be acquired.

Block 906 provides immersive content 116 to one or more devices 102 associated with the user 104 in accordance with the preferences. In the present example, the server 110 may be configured to wait until 2 days have passed since the content 114(1) was provided to the computing device 102(1), at which time the server 110 is to provide selected immersive content 116. The content module 112 then selects immersive content 116(2), which relates to damage caused by a severe storm that occurs early in the story of the content 114(1).

The immersive content 116(2) is then communicated from the server 110 to the computing device 102(1), where the presentation module 106 presents it to the user 104 at a time when the related content 114(1) is not being consumed. In this way, the user 104 receives a brief communication intended to promote interest and excitement in the underlying story of the content 114(1).

Block 908 acquires a consumption status 304 within the content 114 for the user 104. In the present example, the presentation module 106 determines that the user left off at a particular location within the content 114(1) during their most recent reading session. For instance, the user 104 may have recently covered a portion of the content 114(1) regarding farm animals that had gone missing during the severe storm. Thus, the consumption status 304 may correspond to a page number, chapter or line number, or other location within the content 114(1). The corresponding consumption status 304 is then communicated from the computing device 102(1) to the server 110.

Block 910 selects from predetermined immersive content 116 based on the consumption status 304. In the present example, the content module 112 accesses immersive content 116 seeking a predefined portion that corresponds to the consumption status 304 of the user 104. For instance, the content module 112 determines that immersive content 116(3), which relates to finding some of the missing farm animals, correlates to the present consumption status 304. The content module 112 retrieves the immersive content 116(3) from the datastore 822 of the server 110, and formats it as a message from "Darla", a character in the content 114(1).

Block 912 provides the selected immersive content 116 to one or more computing devices 102 associated with the user 104. In the present example, the content module 112 causes the immersive content 116(3) to be sent to an electronic address of the user 104. Thereafter, the computing device 102(1) retrieves the immersive content 116(3) as an e-mail message apparently sent by "Darla", and presents the immersive content 116(3) to the user 104. The user 104 may thus enjoy the story of the content 114(1) even while attending to other tasks. Furthermore, the immersive content 116(3) may convey insights and aspects of the story that are not specifically included in the content 114(1).

Figure 10:
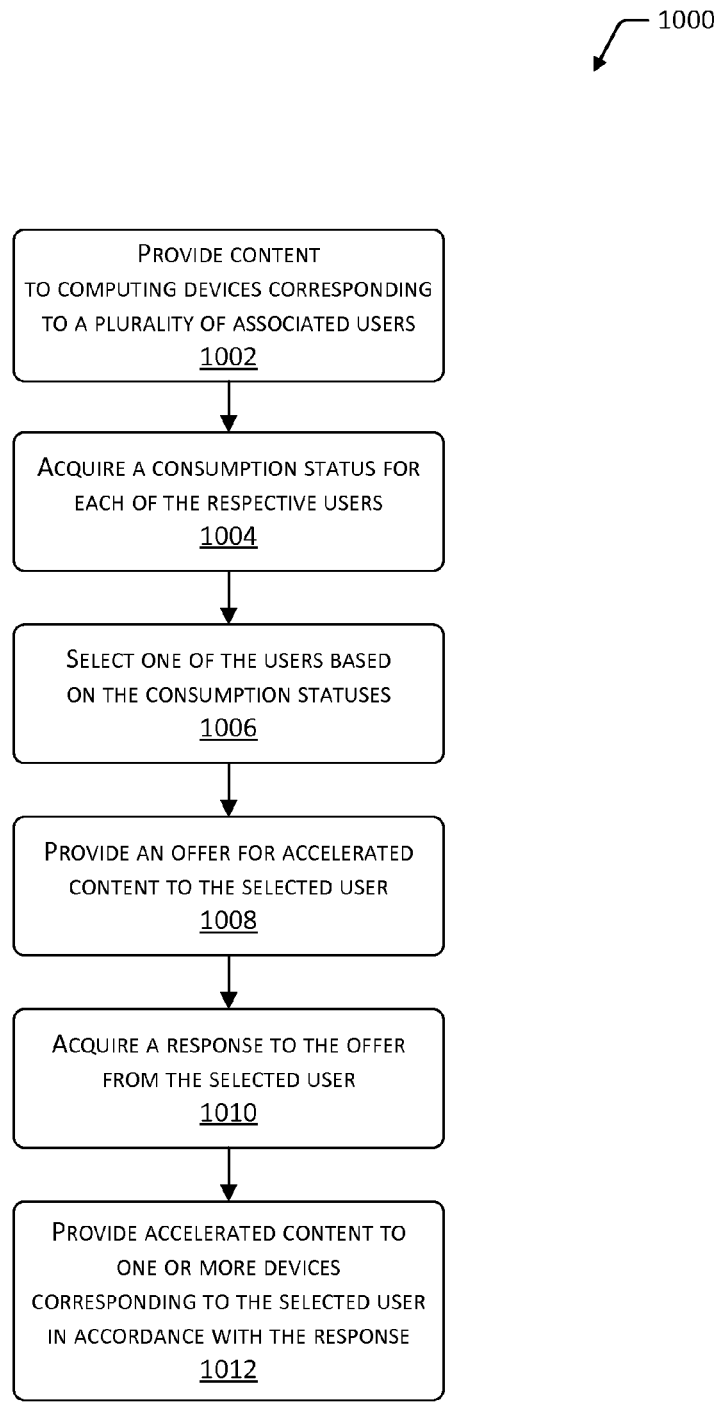
FIG. 10 is a flow diagram of an illustrative process including providing accelerated content to one user associated with a group of users.

FIG. 10 is a flow diagram 1000 illustrating a process including providing story content to numerous users and accelerated content to a selected one of the users. The process of the flow diagram 1000 is illustrative and non-limiting, and other processes including one or more other steps, omitting one or more of the depicted steps, or proceeding in other orders of execution, may also be used.

Block 1002 provides content 114 to computing devices 102 corresponding to a plurality of associated users 104. For purposes of a present example, the three users 104(1) "Joe", 104(2) "Mindy", and 104(3) "Carol", are associated with three computing devices 102(3), 102(4), and 102(5), respectively. The users 104(1)-104(3) are associated as book club members 502. Each of the users 104(1)-104(3) access the server 110 by way of their respective computing devices 102(3)-102(5) and acquires the e-book content 114(1). Thus, each of the users 104(1)-104(3) may now consume the content 114(1) as part of a book club project.

Block 1004 acquires a consumption status 304 for each of the respective users 104. In the present example, a respective presentation module 106 within each of the computing devices 102(3)-102(5) provides a consumption status 304 for the corresponding user 104(1)-104(3). For purposes of illustration, the user 104(1) "Joe" is at chapter 2, line 11, of the content 114(1), while the users 104(2) "Mindy" and 104(3) "Carol" are at chapter 3, line 26, and chapter 3, line 18, respectively. In this way, three respective consumption statuses 304 are acquired and communicated to the server 110 by way of the network(s) 108.

Block 1006 selects one of the users 104(1)-104(3) based on the consumption statuses 304. In the present example, the content module 112 of the server 110 compares the respective consumption statuses 304 and determines that the user 104(1) "Joe" is lagging behind both of the other users 104(2) "Mindy" and 104(3) "Carol". The content module 112 thus selects the user 104(1) "Joe" for operations in the next step.

Block 1008 provides an offer for accelerated content 506 to the selected user 104. In the present example, the content module 112 generates an acceleration offer 504, proposing to provide accelerated content 506 to the user 104(1). The acceleration offer 504 may explain that the user 104(1) "Joe" is behind the other users 104(2) and 104(3) with respect to consuming the content 114(1). The acceleration offer 504 may further explain that the proposed accelerated content 506 would allow the user 104(1) to catch up with the other users 104(2)-104(3) in a quick and convenient manner. The acceleration offer 504 is then communicated from the server 110 to the computing device 102(3).

Block 1010 acquires a response to the offer from the selected user 104. In the current example, the presentation module 106 presents the acceleration offer 504 to the user 104(1) "Joe", who provides input to a control or other device indicating his acceptance of the acceleration offer 504. The acceptance is then communicated from the computing device 102(3) back to the server 110 by way of the one or more networks 108, where it is received by the content module 112.

Block 1012 provides accelerated content 506 to one or more devices 102 corresponding to the selected user 104 in accordance with the response. In the present example, the content module 112 accesses the content 114 within the datastore 720 and locates subject matter within the content 114(1) present between the consumption status 304 of the user 104(1), and that of the user 104(2). Specifically, the content module 112 identifies matter within the content 114(1) between chapter 2, line 11, and chapter 3, line 26.

The content module 112 then generates particular accelerated content 506 in accordance with the identified intervening matter. The accelerated content 506 may include details, character comments or perspectives, or other subject matter determined to be important to the intervening portion of the story "The Stormy Night", and may be formatted as an abstract or a concise presentation of that subject matter. The accelerated content 506 may be generated or formatted in other suitable ways, as well. The content module 112 then causes the accelerated content 506 to be communicated from the server 110 to the computing device 102(1), where it may be presented by the presentation module 106.

The user 104(1) may now understand at least the "gist" of the story up to a point where the other users 104(2) and 104(3) are within the content 114(1). In this way, the user 104(1) may continue to enjoy the e-book "The Stormy Night" and participate with the other book club members 502 without being left behind.

Figure 11:
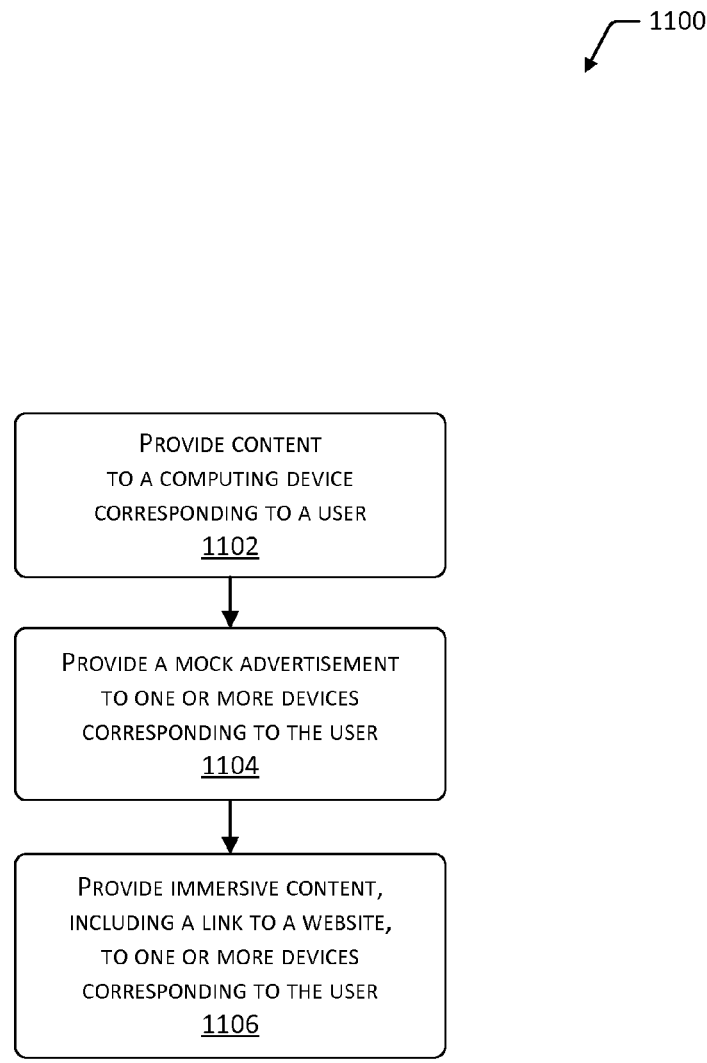
FIG. 11 is a flow diagram of an illustrative process including providing a mock advertisement and immersive content to a user, the immersive content including a link to a website related to the subject matter of the immersive content.

FIG. 11 is a flow diagram 1100 illustrating a process including providing commercial matter with immersive content to a user. The process of the flow diagram 1100 is illustrative and non-limiting, and other processes including one or more other steps, omitting one or more of the depicted steps, or proceeding in other orders of execution, may also be used.

Block 1102 provides content 114 to a computing device 102 corresponding to a user 104. For purposes of a present example, the user 104 uses the computing device 102(1) to access the server 110 by way of the network(s) 108. The user 104 may then browse various available e-books, movies, audio files or music, or other kinds of content 114 available from the server 110 by way of the content module 112. The user 104 provides input selecting the content 114(1), an e-book. The user 104 may also provide contact information, make payment, or perform other steps resulting in the communication of the content 114(1) to the computing device 102(1).

Block 1104 provides a mock advertisement 206 to one or more devices 102 corresponding to the user 104. In the present example, the content module 112 determines that 3 days have passed since the content 114(1) was communicated to the computing device 102(1), surmising that the user 104 has probably consumed at least an initial portion of the corresponding story. The content module 112 then selects the mock advertisement 206 from the datastore 822. The mock advertisement 206 includes imagery and text regarding "Lake Farmington", a location that is introduced early within the story of the content 114(1).

The content module 112 then communicates the mock advertisement 206 to a computing device 102(2) where it may be presented to the user 104 while he is performing other computer-centric activities. The user 104 is therefore exposed to subject matter related to the story of the content 114(1), thus fostering ongoing interest and desire to consume more of the underlying story.

Block 1106 provides immersive content 116 that includes a link 202 to a website to one or more devices 102 corresponding to the user 104. In the present example, the content module 112 may then select immersive content 116(2) from the immersive content 116 within the datastore 822. The immersive content 116(2) provides information about a severe storm that occurs within the story of the content 114(1), and also includes a link 202 to a website regarding real-world severe weather phenomenon.

The immersive content 116(2) is then communicated from the server 110 to the computing device 102(1) of the user 104, where it is presented as a message from a character within the content 114(1). The user 104 may then view the immersive content 116(2), which promotes ongoing interest in the underlying story. The user 104 may then, optionally, activate the link 202 so as to access the severe weather website, if the user 104 so desires.

As described above, a story, a movie, an audio book, or other content 114 is provided to a computing device 102 for consumption by a user 104. Matter related to the content, referred to as immersive content 116, may be provided to the same or other computing devices 102 of the user 104 for presentation or consumption, possibly at times when the content 114 is not being consumed. For instance, a brief e-mail message may carry immersive content 116 to the user 104 during working hours, when the user 104 is not reading from the primary content 114. Such immersive content 116 may be formatted as mock advertising 206, social media postings 116(1), or in other ways, may include links 202 to websites or other resources presenting real-world information related to the content 114, and so on. User 104 involvement in the story or other subject matter of the content 114 is thus supplemented, enhancing the user's overall content consumption experience.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A server device, configured to:
provide, using a communications interface of the server device, content to a computing device associated with a user, wherein the content corresponds to a story;
acquire, using a communications interface of the server device, a user preference regarding immersive content corresponding to the story;
provide, using a communications interface of the server device, first immersive content to the computing device, wherein:
the first immersive content is based on the user preference,
the first immersive content is configured to be presented apart from a presentation of the content, and
the first immersive content corresponds to the story;
acquire, using the communications interface of the server device, a status of the computing device with respect to consumption of the content;
provide, using the communications interface of the server device, second immersive content to the computing device, wherein:
the second immersive content is based on the status, and
the second immersive content corresponds to the story;
provide to the computing device, using the communications interface of the server device, an offer to send accelerated content corresponding to the status of the computing device with respect to consumption of the content;
receive an acceptance of the offer; and
provide, to the computing device, the accelerated content, wherein the accelerated content includes an abbreviated portion of the content.

2. The server device of claim 1, wherein:
the user preference indicates a selection, by the user, of a character in the story; and
the first immersive content is formatted as a message to the user from the character.

3. The server device of claim 1, further configured to provide to the computing device, using the communications interface of the server device, a mock advertisement including text or an image related to the content, wherein the mock advertisement is presented at a different time than a presentation of the content.

4. A method performed at least in part by one or more hardware processors, the method comprising:
providing a first portion of a content configured to be consumed by way of a computing device;
acquiring information regarding a consumption of the first portion of the content by a first user;
providing, without user input and based on the information, immersive content that includes information regarding at least one aspect of the first portion of the content, and wherein the immersive content is configured to re-engage the first user to consume a second portion of the content by way of a computing device;
determining, based at least in part on the information, that the first user has consumed less of the content than a second user, wherein the first user and the second users are members of an association; and
providing, to a device associated with the first user, accelerated content corresponding to the content, wherein the accelerated content is configured to equalize a consumption status of the first user with that of the second user.

5. The method of claim 4, further comprising:
providing a user interface configured to acquire user input regarding user preferences with respect to one or more elements of the content; and
acquiring at least some of the information by way of the user interface.

6. The method of claim 4, wherein:
the information includes a user selection regarding a character in the content; and
the immersive content is formatted as a message from the character to the first user.

7. The method of claim 4, further comprising providing the second portion of the content configured to be consumed by way of a computing device.

8. The method of claim 4, wherein:
the content is provided to a first computing device associated with the first user; and
the immersive content is provided to a second computing device associated with the first user.

9. The method of claim 4, wherein the immersive content is provided as at least one of a cellular text message, a social media posting, an e-mail message, or an e-book presentation.

10. The method of claim 4, wherein:
the content is configured to be presented by way of a first application of a computing device associated with the first user; and
the immersive content is configured to be presented by way of a second application of the computing device associated with the first user.

11. The method of claim 4, further comprising:
issuing a query corresponding to the first portion of the content;
selecting, in accordance with a response to the query, the second portion of the content from a non-transitory storage media; and
providing the second portion of the content configured to be consumed by way of a computing device.

12. The method of claim 4, further comprising providing, with the immersive content, a link to material regarding an aspect of the immersive content, wherein the material is accessible by way of a computing device.

13. The method of claim 4, further comprising providing a mock advertisement, wherein the mock advertisement includes one or more of immersive content or a link to material corresponding to the content.

14. The method of claim 4, further comprising:
acquiring a user input indicative of a time preference for receiving the immersive content; and
providing the immersive content in accordance with the time preference.

15. A non-transitory computer readable storage medium including a program code, the program code configured to cause one or more hardware processors to:
acquire a user input corresponding to content that has been provided to a first user, wherein the user input includes at least a time preference, or a selection of a character referenced in the content; and
provide, in accordance with the user input, immersive content to the first user, wherein the immersive content is a narrative of one or more aspects of the content, and wherein the immersive content corresponds to an element within the content that has been consumed by the first user;
provide the content to a device associated with a second user, wherein the second user is associated with the first user;
determine that the first user has consumed less of the content than the second user;
provide, to a least one device associated with the first user, an offer to send accelerated content related to the content; and
provide, to at least one device associated with the first user, the accelerated content.

16. The non-transitory computer readable storage media of claim 15, the program code further configured to cause the one or more hardware processors to:
provide the content to a first device associated with the first user; and
provide the immersive content to a second device associated with the first user.

17. The non-transitory computer readable storage media of claim 15, wherein:
the immersive content includes matter related to an aspect of the content; and
the immersive content includes non-commercial matter not included in the content.

18. The server device of claim 1, wherein:
the immersive content includes non-commercial matter not included in the content.

19. The server device of claim 1, wherein the first immersive content comprises as a message to the first user that appears to be from a character in the content.

20. The non-transitory computer readable storage media of claim 15, wherein the immersive content comprises as a message sent to the first user that appears to be from a character in the content.

* * * * *